United States Patent
Alumbaugh et al.

(10) Patent No.: US 8,008,921 B2
(45) Date of Patent: Aug. 30, 2011

(54) SURVEYING USING VERTICAL ELECTROMAGNETIC SOURCES THAT ARE TOWED ALONG WITH SURVEY RECEIVERS

(75) Inventors: David L. Alumbaugh, Berkeley, CA (US); Andrea Zerilli, Fiorenzuola (IT); H. Frank Morrison, Berkeley, CA (US); Martin Howlid, Blommenholm (NO); James P. Brady, Houston, TX (US); Leendert Combee, Oslo (NO); Edward Nichols, Berkeley, CA (US); Nestor Cuevas, Albany, CA (US)

(73) Assignee: WesternGeco L.L.C., Houston, TX (US)

( * ) Notice: Subject to any disclaimer, the term of this patent is extended or adjusted under 35 U.S.C. 154(b) by 442 days.

(21) Appl. No.: 12/174,179

(22) Filed: Jul. 16, 2008

(65) Prior Publication Data

US 2010/0013485 A1    Jan. 21, 2010

(51) Int. Cl.
*G01V 3/15* (2006.01)
(52) U.S. Cl. ........................................ 324/365
(58) Field of Classification Search .............. 324/332, 324/334, 345, 347, 354, 357, 360, 365
See application file for complete search history.

(56) References Cited

U.S. PATENT DOCUMENTS

| | | | |
|---|---|---|---|
| 4,617,518 A | 10/1986 | Srnka | |
| 6,023,168 A | 2/2000 | Minerbo | |
| 6,603,313 B1 | 8/2003 | Srnka | |
| 2001/0046185 A1 | 11/2001 | Hornbostel et al. | |
| 2007/0135974 A1 | 6/2007 | Fielding et al. | |
| 2007/0229083 A1* | 10/2007 | Tenghamn et al. | 324/347 |
| 2007/0294036 A1 | 12/2007 | Strack et al. | |
| 2008/0008032 A1 | 1/2008 | Welker | |
| 2008/0025146 A1 | 1/2008 | Welker | |
| 2009/0140741 A1* | 6/2009 | Tenghamn et al. | 324/347 |
| 2009/0296519 A1 | 12/2009 | Keers | |
| 2010/0102821 A1 | 4/2010 | Alumbaugh | |
| 2010/0171501 A1 | 7/2010 | Alumbaugh | |

FOREIGN PATENT DOCUMENTS

| | | |
|---|---|---|
| EP | 0905351 A2 | 3/1999 |
| WO | 2004008183 A2 | 1/2004 |
| WO | 2007006785 A2 | 1/2007 |
| WO | 2007053025 A1 | 5/2007 |
| WO | 2007089486 A2 | 8/2007 |
| WO | 2008008127 A3 | 1/2008 |

OTHER PUBLICATIONS

Davydycheva, et al., Electrical-Prospecting Method for Hydrocarbon search using the Induced-Polarization Effect, Geophysics, Jul.-Aug. 2006, pp. G179-G189, vol. 71, No. 4.
Moldoveanu, et al., Over/Under Towed-Streamer Acquisition: A Method to Extend Seismic Bandwidth to both Higher and Lower Frequencies, The Leading Edge, Jan. 2007, pp. 41-58.
Chave et al., Chapter 12—Electrical Exploration Methods for the Seafloor, 1991 (pp. 931-966).
PCT Search Report, dated Jan. 21, 2011, Application No. PCT/US2009/050529.
Cerkaeva et al., Optimal Survey Design using Focused Resistivity Arrays, IEEE Transactions on Geoscience and Remote Sensing, Mar. 1996, pp. 358-366, vol. 34, No. 2.
U.S. Appl. No. 12/349,861, Non-Final Rejection dated Feb. 7, 2011, pp. 1-15 and attachments.

* cited by examiner

*Primary Examiner* — Kenneth J Whittington

(57) ABSTRACT

A system to perform a marine subterranean survey includes at least one vertical electromagnetic (EM) source and at least one EM receiver to measure a response of a subterranean structure that is responsive to EM signals produced by the vertical EM source. At least one tow cable is used to tow the EM source and EM receiver through a body of water.

19 Claims, 4 Drawing Sheets

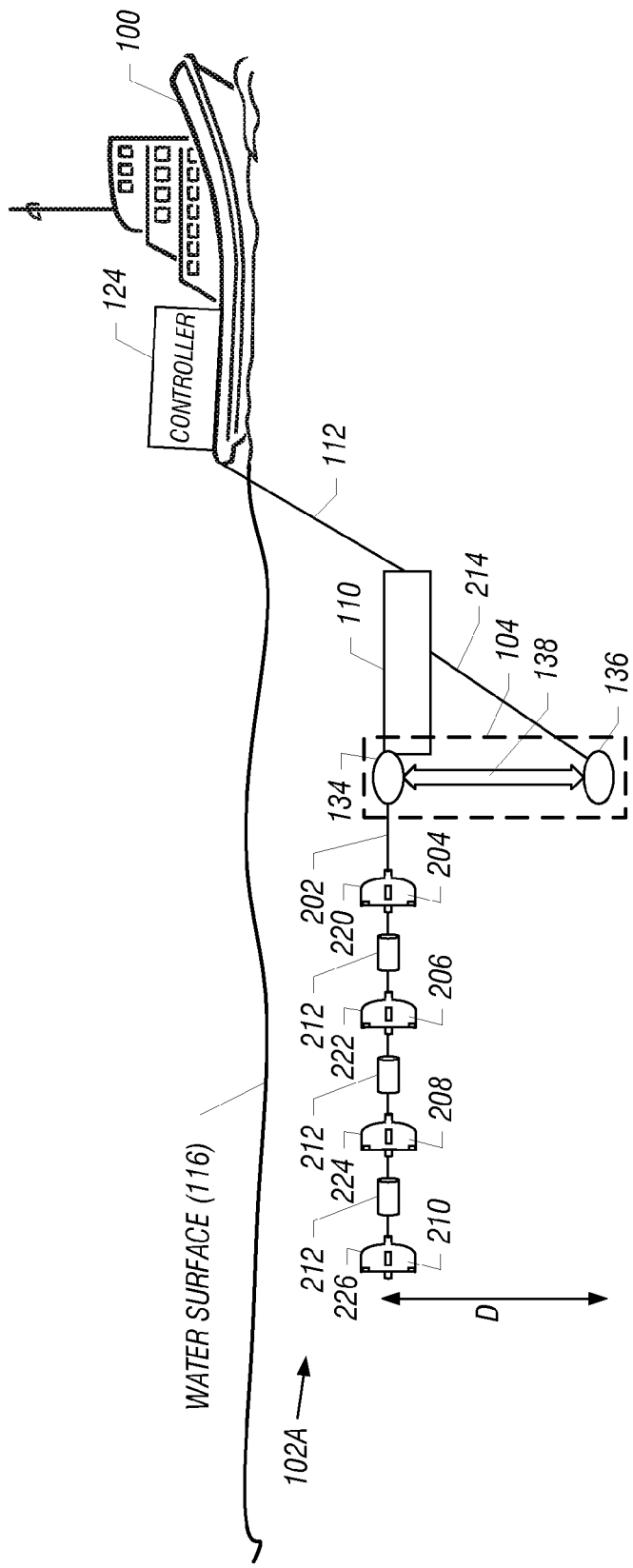
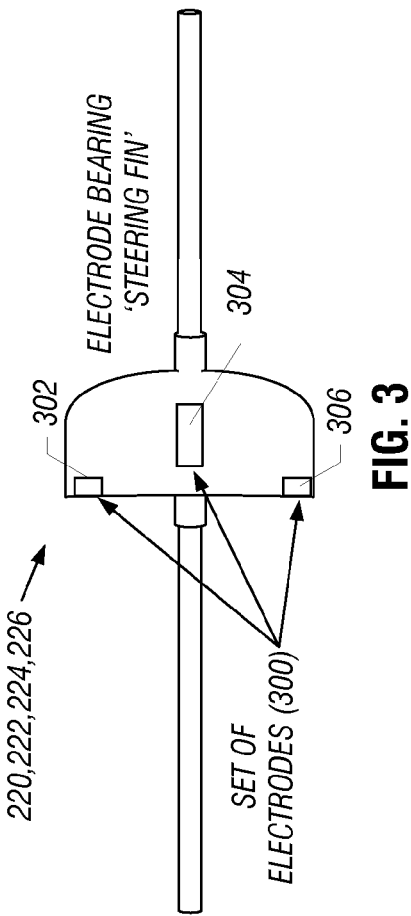

SURVEYING USING VERTICAL ELECTROMAGNETIC SOURCES THAT ARE TOWED ALONG WITH SURVEY RECEIVERS

TECHNICAL FIELD

The invention relates generally to an electromagnetic (EM) survey technique in which vertical EM sources are used in a system in which both the EM sources and survey sensors are towed.

BACKGROUND

Various electromagnetic (EM) survey techniques exist to perform surveys of a subterranean structure for identifying subterranean elements of interest. Examples of subterranean elements of interest include hydrocarbon-bearing reservoirs, gas injection zones, thin carbonate or salt layers, and fresh-water aquifers. One type of EM survey technique is the magnetotelluric (MT) survey technique that employs time measurements of electric and magnetic fields (which are responsive to naturally occurring electromagnetic fields) for determining the electrical conductivity distribution beneath the surface. Another type of EM survey technique is the controlled source electromagnetic (CSEM) survey technique, in which an EM transmitter, called a "source," is used to generate EM signals. With either EM survey technique, surveying units, called "receivers," are deployed on a surface (such as at the sea floor or on land) within an area of interest to make measurements from which information about the subterranean structure can be derived. The EM receivers may include a number of sensors for detecting any combination of electric fields, electric currents, and magnetic fields.

In a marine environment, EM sources are typically towed by a marine vessel through a body of water. Conventionally, EM receivers are deployed on the sea floor. However, it can be labor and time intensive to deploy and recover EM receivers deployed on a sea floor.

Moreover, a further issue associated with certain EM sources is that they tend to excite two modes of EM fields: a transverse magnetic (TM) mode and a transverse electric (TE) mode. Typically, EM fields according to the TM mode are sensitive to thin resistors in the subterranean structure, while EM fields according to the TE mode are insensitive to the thin resistors in the subterranean structure. Unfortunately, the TE mode that is insensitive to thin resistors often dominates the measured response. In addition, the resulting response based on the processing of the measured EM data contains not only the scattered field that contains information regarding the subterranean structure, but also a "primary" field that contains no information about the subterranean structure, which can lead to inaccurate results.

SUMMARY

In general, according to an embodiment, a system for performing a marine subterranean survey includes at least one vertical electromagnetic (EM) source, and at least one EM receiver to measure a response of a subterranean structure that is responsive to EM signals produced by the vertical EM source. At least one tow cable is used to tow the at least one vertical EM source and the at least one EM receiver through a body of water.

Other or alternative features will become apparent from the following description, from the drawings, and from the claims.

BRIEF DESCRIPTION OF THE DRAWINGS

FIGS. 2-5 illustrate other arrangements that include other types of vertical EM sources, in accordance with other embodiments.

DETAILED DESCRIPTION

Figure 1:
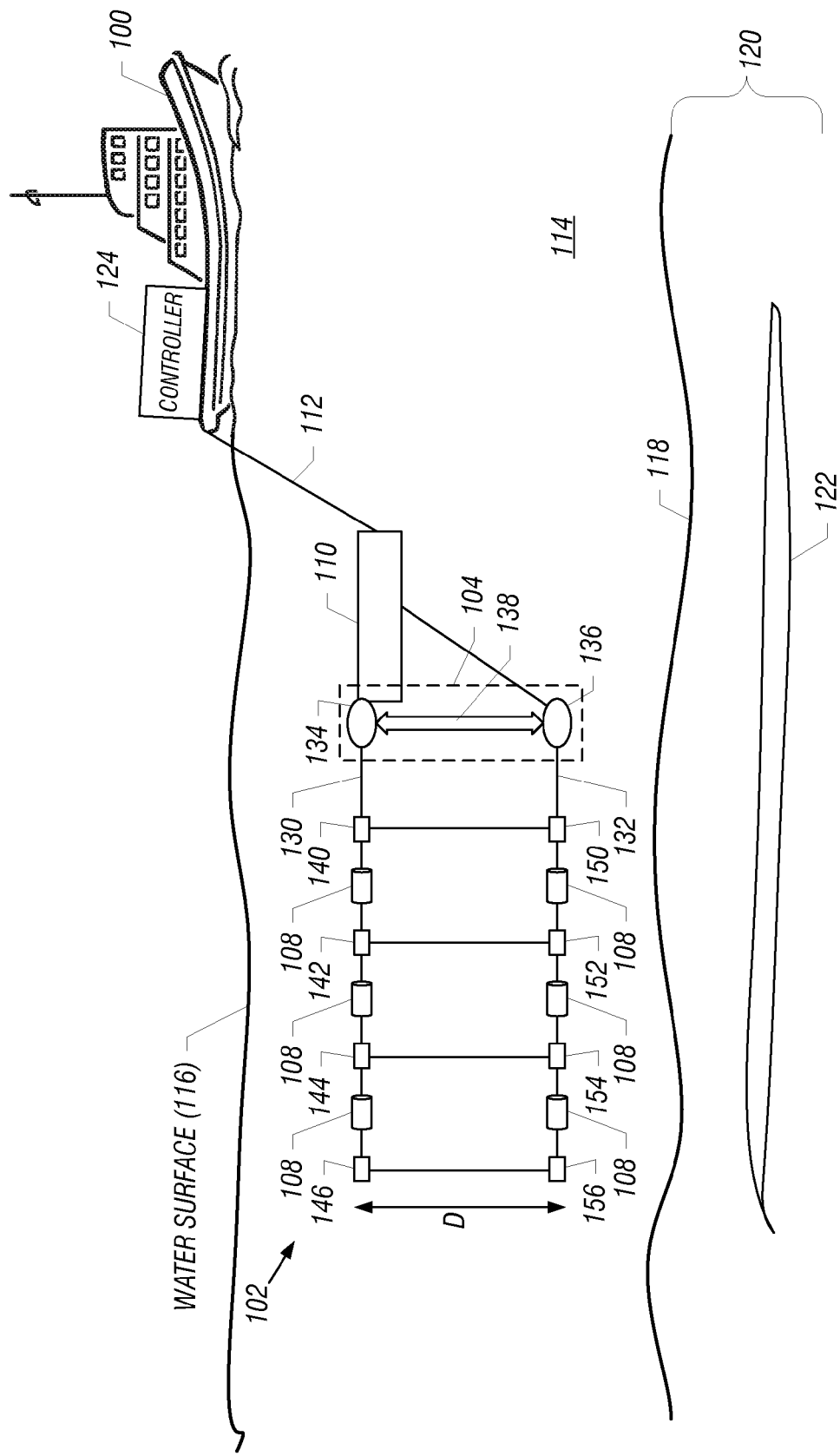
FIG. 1 illustrates an exemplary marine survey arrangement in which a vertical electromagnetic (EM) source and EM receivers are towed by a marine vessel, according to an embodiment.

In the following description, numerous details are set forth to provide an understanding of the present invention. However, it will be understood by those skilled in the art that the present invention may be practiced without these details and that numerous variations or modifications from the described embodiments are possible.

In accordance with an embodiment, a controlled source electromagnetic (CSEM) survey technique is provided in which at least one "vertical" electromagnetic (EM) source is towed by a marine vessel. In addition, EM receivers are also towed by either the same marine vessel or by a different marine vessel. In this manner, the EM source is towed along with the EM receivers through a body of water to perform CSEM surveying.

In some examples, the vertical EM source is a vertical electrical dipole source. More generally, a vertical EM source refers to an EM source in which EM fields are generated in response to electrical current flowing in a vertical direction, which is the direction that is generally perpendicular to a thin body of interest (e.g., a thin resistive layer) within a subterranean structure. A vertical direction can refer to an up-down direction that is generally perpendicular to the sea surface.

The vertical EM source is towed behind and beneath the marine vessel some distance above a water bottom surface, such as the sea floor. The vertical EM source produces EM signals that are propagated into a subterranean structure. The response of the subterranean structure to the EM signals generated by the vertical EM source is measured by EM receivers that are also towed some distance behind and beneath the same marine vessel, or a different marine vessel. The response can be in the form of electric fields and/or magnetic fields. The targets of the CSEM survey technique according to some embodiments can be thin resistive bodies, such as oil-bearing reservoirs, gas injection zones, methane-hydrate deposits, thin carbonate or salt layers, fresh water aquifers, and so forth.

In some embodiments, use of a vertical EM source assures (or increases the likelihood) that only a mode of the EM fields that are sensitive to thin resistors at depths in the subterranean structure is excited. This mode of interest is the transverse magnetic (TM) mode. Moreover, by towing both the EM source and EM receivers using one or more tow cables, more time efficient survey data acquisition can be performed, since the process of deploying or removing EM receivers into or from the water bottom surface is avoided.

Moreover, in some embodiments, measurements collected by the EM receivers are performed when a primary field is not present (in other words, when the EM source is off). This can be accomplished either by providing some impulse burst of EM energy (to pulse the subterranean structure), or by measuring the EM fields after an initial DC field has been rapidly terminated. In this way, the response measured by the EM receivers does not include the primary field, which is the field that would be measured in the absence of any conductive material. By not including the primary field in the response, unwanted signals with no information about the earth can be eliminated from the response measured by the EM receivers.

The vertical EM source can be energized with an impulsive or step off current. An impulsive current is a current pulse that is activated from off to on then off. A step off current is a current that is initially on and then deactivated.

A group of EM receivers that are towed in the body of water can make measurements continuously. The vertical EM source and the EM receivers can occupy the same tow cable, or can be mounted on separate tow cables. In the ensuing discussion, it is assumed that both the EM source and EM receivers are towed by the same tow cable. However, the same techniques apply to arrangements in which multiple tow cables are provided to tow EM sources and EM receivers.

The measurements made by the EM receivers can be communicated to a processing system, such as a computer, as a time series of data points (measured data over time). Although the entire time series can be measured, including when the EM source is on, the data processing applied by the processing system would be focused on analyzing the data after the EM source has been shut off such that only the secondary field that is scattered by the surrounding subterranean medium is measured (and the primary field is not measured). As noted above, using the vertical EM source allows only the TM mode to be energized, and since there is no air-wave generated by a pure TM source, only signals that are sensitive to a thin resistor at depth are generated.

Various configurations of marine surveying arrangements that employ different types of vertical EM sources are depicted in FIGS. 1-5. However, note that other types of vertical EM sources can be used in other implementations.

FIG. 1 shows an exemplary marine survey arrangement that includes a marine vessel 100 that tows an assembly 102 of a vertical EM source 104 (made up of source electrodes 134 and 136), electric field receivers (made up of electrodes 140, 142, 144, 146, 150, 152, 154, and 156), and magnetometers 108. The electric field receivers are used to measure electric fields. The magnetometers 108 (either 1-2-3 components or total field magnetometers) are used to measure magnetic fields. The magnetometers 108 can be used to measure the magnetic fields at various offsets. The electric field receivers and magnetometers collectively are considered EM receivers (for measuring both electrical and magnetic fields).

The assembly 102 is operatively connected to an electronic module 110 that contains electronic circuitry, such as transceiver circuitry for communicating with the EM source 104 and EM receivers in the assembly 102, and to communicate with the marine vessel 100.

The assembly 102 and electronic module 110 are towed by a tow cable 112 (attached to the marine vessel 100) through a body of water 114 located between a water surface 116 and a bottom surface 118 (e.g., sea floor). A subterranean structure 120 is located underneath the bottom surface 118, with the subterranean structure 120 containing one or more subterranean elements 122 of interest that can be detected by the survey system depicted in FIG. 1.

A controller 124 is depicted as being part of the marine vessel 100. The controller 124 is able to receive measurements made by the EM receivers to process the received measurements for analyzing the content of the subterranean structure 120.

The assembly 102 includes two electrical cables 130 and 132, with each electrical cable 130, 132 having a number of electrodes. The two electrical cables 130 and 132 are spaced apart by some vertical distance D, as depicted in FIG. 1. Although not depicted, steering devices can be associated with the electrical cables 130 and 132 to accurately position the cables 130 and 132 with respect to each other such that the vertical over-under arrangement is maintained between the cables 130 and 132.

The electrical cable 130 includes a first source electrode 134, and the cable 132 includes a second source electrode 136, where the source electrodes 134 and 136 are spaced apart by the distance D. The source electrodes 134 and 136 are part of the vertical EM source 104. The source electrodes 134 and 136 are aligned above and below each other such that when a current is passed between them (with the direction of current flow depicted with double arrows 138), a vertical electric dipole is created.

Although not depicted, each electrical cable 130 and 132 can also include a set of source electrodes that are arranged along the length of the corresponding cable such that a horizontal electric dipole is provided on each cable 130 and 132.

In addition to the source electrodes, both cables 130 and 132 contain a series of receiver electrodes such that the horizontal electric field can be measured between electrodes that are adjacent to each other along the cable, and the vertical electric field is measured between the two cables. The receiver electrodes along cable 130 are 140, 142, 144, and 146, while the receiver electrodes along cable 132 are 150, 152, 154, and 156.

In operation, as the marine vessel 100 tows the assembly 102 through the body of water 114, the controller 124 can send commands to the electronic module 110 to cause activation of the vertical EM source 104. Activation of the vertical EM source 104 causes EM fields according to the TM mode to be generated and to be propagated into the subterranean structure 120. EM signals that are affected by the subterranean structure 120 are detected by the electric field receivers and the magnetometers 108 of the assembly 102. As noted above, the electric field receivers made up of the receiver electrodes 140, 142, 144, 146, 150, 152, 154, and 156 measure the electric fields, with receiver electrodes along each cable measuring horizontal electric fields, and two vertically spaced receiver electrodes on respective cables 130 and 132 measuring vertical electric fields. Also, the magnetometers 108 measure magnetic fields.

The data measured by the receiver electrodes and the magnetometers are communicated back along electrical cables 130 and 132 to the electronic module 110. The electronic module 110 can then store the measured data, or alternatively, can communicate the measured data in real time to the controller 124 for processing.

FIG. 2 shows an alternative arrangement in which an assembly 102A of EM source 104 and receivers is provided. The assembly 102A includes just one electrical cable 202 that has a number of electrodes (134, 204, 206, 208, 210) and magnetometers 212. A second electrical cable, such as electrical cable 132 depicted in FIG. 1, is not provided in FIG. 2. Instead, in FIG. 2, the second source electrode 136 is coupled over an electrical link 214 to the electronic module 110. Some mechanism is provided to maintain the over-under arrangement of the source electrodes 134 and 136 such that vertical current flow occurs between the electrodes.

FIG. 2 depicts a single-cable measurement configuration where a single horizontal electrical cable 202 is towed at some depth behind the vertical EM source 104. In FIG. 2, receiver electrode sets 204, 206, 208, and 210 are built into respective steering fins 220, 222, 224, and 226 (or other types of steering devices). A steering fin is controllable to adjust a direction of current of the cable 202.

As depicted in FIG. 3, each steering fin (220, 222, 224, 226) includes a set 300 of three electrodes 302, 304, and 306. The set 300 can be any one of sets 204, 206, 208, and 210 in FIG. 2. The vertical electric field measurements are made between electrodes 302 and 306 in the same steering fin, while the horizontal electric field measurements are made between electrodes 304 of adjacent fins.

Figure 4:
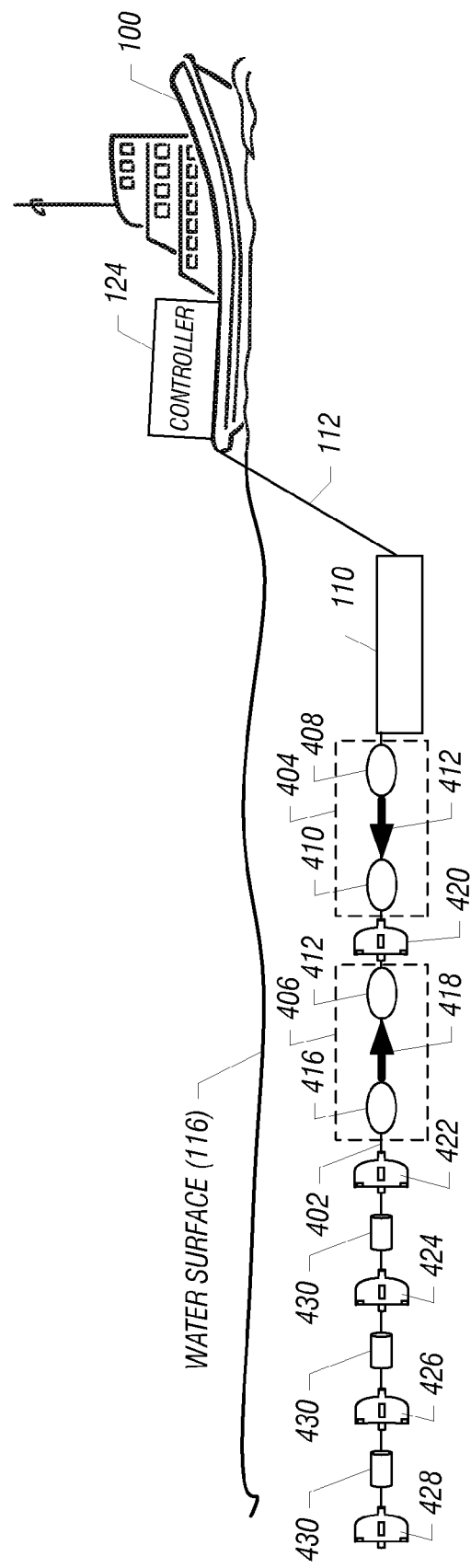

FIG. 4 shows another single-cable measurement configuration that uses a virtual vertical source. In this arrangement, a single electrical cable 402 is towed behind two horizontal EM sources 404 and 406 whose moments are opposed. The horizontal EM source 404 includes electrodes 408 and 410, and the direction of current flow is depicted by arrow 412 (from electrode 408 to electrode 410). The horizontal EM source 406 includes electrodes 412 and 416, with a direction of current flow depicted by arrow 418 (from electrode 416 to electrode 412). The directions of current flow in the two horizontal EM sources are opposed to each other (and thus, their moments are opposed). The two sets of opposing currents cancel horizontal (TE) fields while enhancing vertical TM fields. As a result, the two horizontal sources 404 and 406 with opposing moments provide a virtual vertical source.

As with the embodiments of FIGS. 2 and 3, receiver electrodes are built into steering fins 420, 422, 424, 426, and 428. Also, magnetometers 430 are provided on the cable 402.

Figure 5:
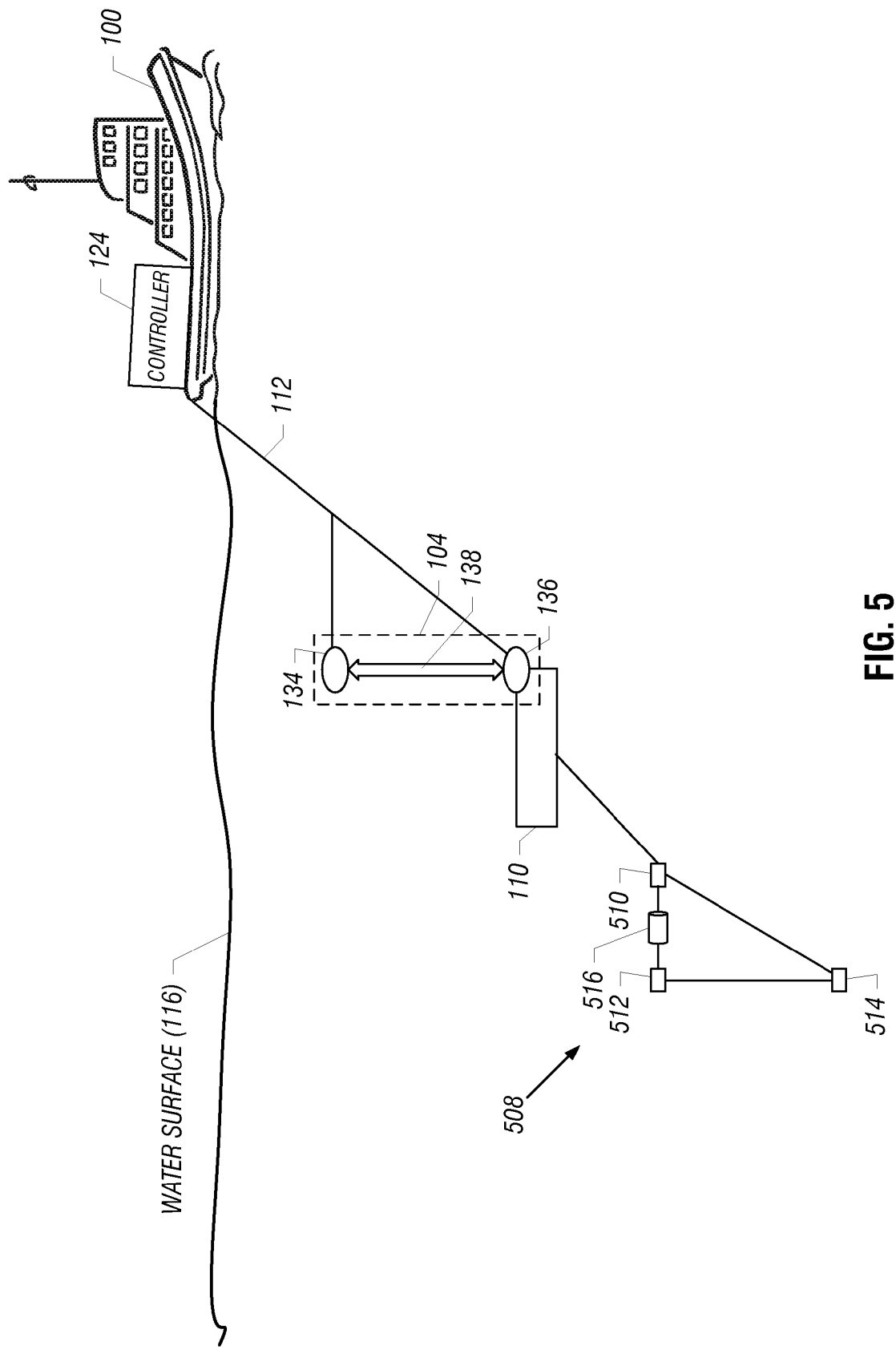

FIG. 5 shows yet another possible arrangement, in which the electronic module 110 is provided between the vertical EM source 104 (that has source electrodes 134 and 136) and an assembly 508 of receiver electrodes 510, 512, and 514, and magnetometer 516. When activated, the vertical EM source 104 produces EM signals that are affected by a subterranean structure. The affected EM signals are measured by the receiver electrodes 510, 512, and 514, and by the magnetometer 516. A horizontal electric field is measured by receiver electrodes 510 and 512, while a vertical electric field is measured by electrodes 512 and 514.

The arrangement of FIG. 5 does not have a long, horizontal cable as in the other embodiments.

In alternative implementations, an electrical cable containing EM source and receiver electrodes can be arranged such that all sources and receivers are entirely vertical (although keeping all elements vertical in such a vertical-only system would be impractical because of mechanism stress on the cables when the vessel is in motion).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A system for performing a marine subterranean survey, comprising:
    at least one vertical electromagnetic (EM) source, wherein the vertical EM source includes a first horizontal EM source and a second horizontal EM source, the first and second EM sources having opposing moments;
    at least one EM receiver to measure a response of a subterranean structure that is responsive to EM signals produced by the vertical EM source; and
    at least one tow cable to tow the at least one vertical EM source and the at least one EM receiver through a body of water.

2. The system of claim 1, wherein the at least one tow cable comprises a first tow cable to tow the at least one vertical EM source, and a second tow cable to tow the at least one EM receiver.

3. The system of claim 1, wherein the at least one tow cable comprises a single cable to tow the at least one vertical EM source and the at least one EM receiver.

4. The system of claim 1, further comprising a first electrical cable having plural receiver electrodes, wherein some of the receiver electrodes are part of the at least one EM receiver.

5. The system of claim 4, further comprising:
    a second electrical cable having plural receiver electrodes, wherein a pair of receiver electrodes along one of the first and second electrical cables is used to measure a horizontal electric field, and a pair of receiver electrodes arranged vertically with respect to each other is used to measure a vertical electric field.

6. The system of claim 4, further comprising at least one magnetometer that is part of the first electrical cable.

7. The system of claim 1, wherein the first horizontal EM source includes a first pair of source electrodes, and the second horizontal EM source includes a second pair of source electrodes.

8. The system of claim 1, further comprising a steering device to steer an assembly of the at least one EM source and EM receiver.

9. The system of claim 8, wherein the steering device includes receiver electrodes that are part of the EM receiver.

10. The system of claim 8, further comprising additional steering devices having respective receiver electrodes.

11. An apparatus for performing a marine subterranean survey, comprising:
    at least one vertical electromagnetic (EM) source to be towed through a body of water, wherein the vertical EM source includes a first horizontal EM source and a second horizontal EM source, the first and second EM sources having opposing moments; and
    at least one EM receiver to be towed through the body of water, wherein the at least one EM receiver is to measure EM fields affected by a subterranean structure in response to EM signals generated by the at least one EM source.

12. The apparatus of claim 11, further comprising an electronic module connected to the EM source and EM receiver.

13. The apparatus of claim 11, further comprising a tow cable to tow the EM source and EM receiver.

14. A method of performing a marine subterranean survey, comprising:
    towing at least one vertical electromagnetic (EM) source through a body of water, wherein the vertical EM source includes a first horizontal EM source and a second horizontal EM source, the first and second EM sources having opposing moments;
    towing at least one EM receiver through the body of water; and
    measuring EM fields affected by a subterranean structure in response to EM signals produced by the at least one vertical EM source.

15. The method of claim 14, wherein measuring the EM fields is in response to the at least one EM source that has been energized with an impulsive or turn off current.

16. The method of claim 15, further comprising processing measured data collected by the at least one EM receiver when the at least one EM source is off.

17. The method of claim 14, wherein the at least one vertical EM source excites EM signals according to a transverse magnetic (TM) mode.

18. The method of claim 14, further comprising using a steering device to steer an electrical cable on which electrodes of the EM source and EM receiver are provided.

19. The method of claim 18, further comprising providing at least one of the electrodes in the steering device.

* * * * *